United States Patent Office 3,104,231
Patented Sept. 17, 1963

3,104,231
AQUEOUS EMULSION OF CROSS-LINKED TERPOLYMERS FREE OF MICROGEL AND METHOD OF MAKING SAME
Robert McLellan Fitch, Cynwyd, Pa., assignor to E. I. du Pont de Nemours and Company, Wilmington, Del., a corporation of Delaware
No Drawing. Filed Apr. 8, 1960, Ser. No. 20,802
17 Claims. (Cl. 260—29.7)

This invention relates to novel aqueous dispersion polymer compositions derived from monomer compositions essentially comprising at least one monoethylenically unsaturated monomer having a terminal vinylidene group $>C=CH_2$ and to the technique of polymerizing such monomers to aqueous dispersion polymer compositions having a high polymer content. More particularly, the invention relates to aqueous dispersion copolymer compositions derived from monomer mixtures containing a plurality of monoethylenically unsaturated monomers having the terminal vinylidene group and including an ester of an alpha ethylenically unsaturated monocarboxylic acid with an alkanol and to the process of copolymerizing such monomer mixtures by aqueous emulsion polymerization in the presence of an effective small proportion of a copolymerizable difunctional chain extender having two terminal vinylidene groups per molecule.

Aqueous emulsion polymerization of mixtures of ethylenically unsaturated monomers, at least ternary in composition, are described in United States Patents 2,787,603, 2,787,561, 2,753,318, 2,868,752 and 2,918,391. Examples in these several patents show aqueous polymerization charges in which the non-polymerizable components constitute a preponderant proportion of the total composition, the copolymer content of the product ordinarily being no greater than 45% by weight and in most instances less than 40%. While products having this copolymer content can be prepared in adequately stable aqueous dispersion form and find practical utility at these concentrations, it is desirable to have dispersion products in which the content of the copolymer is significantly higher than that of the typical compositions described in these patents. Two significant advantages of stable high solids content aqueous dispersion copolymer compositions are the economic advantage of (1) transporting less water and more copolymer per unit of aqueous product shipped and (2) the application of greater solids content per coat with the accompanying lesser amount of water to be removed by volatilization in drying the coating.

Although aqueous dispersion copolymer products having a moderately higher content of copolymer can be obtained by following the respective examples in the aforementioned patents using an increased proportion of monomer charge and a correspondingly decreased proportion of water, the polymerization conditions are changed sufficiently to result in the characteristics of the copolymer being different from those of the copolymer prepared at the usual lower concentration. Ordinarily, undesirable proportions of coagulum result in such processing at the higher concentrations. While changes in the polymerization process can be effected to provide a substantially equivalent copolymer in aqueous dispersion form, the economic advantage of high solids content of copolymer is offset by economic disadvantages in the altered process. It is known that high solids content is obtained by increasing the stability of the aqueous dispersion of the polymer during and after polymerization. Increased stability is accomplished by increasing the particle-size and by continuous addition of monomer during the polymerization. However, these changes have the effect of reducing the molecular weight of the polymer and of increasing the polymerization time. The polymerization time can be reduced by increasing the proportion of polymerization initiator, but this also results in reduced molecular weight of the polymer.

I have discovered that stable aqueous dispersion polymer compositions having a high content of polymer are prepared economically by conducting the aqueous emulsion polymerization of one or more polymerizable monovinylidene unsaturated monomers in the presence of an effective small proportion of a difunctional polymer chain extender which promotes an adequate increase in molecular weight. Suitable chain extenders have two terminal vinylidene groups and effective proportions ordinarily range from $10^{-5}$ to 1 mol percent based on the total mols of polymerizable monomers. The maximum proportion of the bis-vinylidene chain extender in any particular combination of monomers is that which, when exceeded, results in formation of microgel. This maximum proportion is readily determined by pilot experimentation at several levels of bis-vinylidene chain extender concentration in the range of up to 1 mol percent of the total monomer content. The respective relative viscosities of the several resulting pilot polymers are determined and the values plotted against the concentration of the difunctional chain extender. The curve representing the plotted results ordinarily will show an inflection corresponding to a maximum relative viscosity under the particular polymerization conditions selected. The concentration of difunctional chain extender corresponding to this inflection in the curve is the maximum useful concentration under the particular polymerization conditions. Use of a concentration of the difunctional chain extender beyond htis maximum results in microgel formation which is reflected by a decrease in the relative viscosity of the polymer.

The following are typical pilot experiments to illustrate determination of the maximum useful concentration of the difunctional chain extender in a simple monomer composition.

SERIES A

A polymerization charge of 100 grams of methyl methacrylate, 130 grams of distilled water, 10 ml. of an aqueous solution of ammonium persulfate, $(NH_4)_2S_2O_8$, at 5% concentration and 10 ml. of an aqueous solution of sodium lauryl sulfate, "Duponol" C, at 5% concentration are charged into a sealable bottle, capped and tumbled for one hour at 85° C. Additional polymerization charges are prepared by replacing an aliquot portion of the methyl methacrylate monomer with a mixture of vinyl methacrylate and methyl methacrylate having a content of 0.112% of the vinyl methacrylate. The respective proportions of the monomer mixture supplied is sufficient to provide $10^{-3}$, $10^{-2}$, $10^{-1}$ and 1 mol percent of the bis-vinylidene chain extender, i.e., vinyl methacrylate, based on the mols of methyl methacrylate. These polymerization charges are processed the same as the methyl methacrylate charge containing no bis-vinylidene chain extender. The relative viscosity of the resulting aqueous polymerization products is determined at 0.5% polymer content in dimethyl formamide. The following table is typical of the relative viscosity data.

Table 1

| Mol percent vinyl methacrylate: | Relative viscosity |
|---|---|
| 0 | 1.29 |
| $10^{-3}$ | 1.30 |
| $10^{-2}$ | 1.31 |
| $10^{-1}$ | 1.52 |
| 1 | 1.08 |

Microgel is in evidence in polymer product based on the monomer charge including the 1 mol percent of the difunctional chain extender. The inflection in the curve is between $10^{-1}$ and 1 mol percent of the vinyl methacrylate.

SERIES B

A second polymerization series similar to Series A is prepared by using a charge of 130 grams of distilled water, 104 grams of styrene, 10 ml. of aqueous 5% $(NH_4)_2S_2O_8$ and 1 ml. of aqueous 5% sodium lauryl sulfate as a reference composition. Other members of the series are prepared by including with the above indicated composition respective amounts of divinyl benzene sufficient to provide proportions of this difunctional chain extender in the range of $10^{-5}$ to 1 mol percent based on the mols of styrene. Pop bottles containing these respective emulsion polymerization charges are tumbled at 85° C. for three hours. The relative viscosities at 0.5% in dimethyl formamide for the resulting polymers are shown in Table 2.

Table 2

| Mol percent divinyl benzene: | Relative viscosity |
| --- | --- |
| 0 | 1.25 |
| $10^{-5}$ | 1.25 |
| $10^{-4}$ | 1.26 |
| $10^{-3}$ | 1.36 |
| $10^{-1}$ | 1.21 |
| 1 | 1.07 |

The aqueous dispersion polymer products derived from the respective charges containing $10^{-1}$ and 1 mol percent of the difunctional chain extender exhibit microgel formation. The inflection in the curve representing the data of Table 2 is at a concentration corresponding to about $10^{-2}$ mol percent of divinyl benzene.

Thus, it is recognized that an effective small molar proportion of a difunctional chain extender at a concentration below that at which microgel is formed provides a means for increasing the relative viscosity, i.e., the molecular weight. This higher molecular weight is compensatory for polymerization conditions directed to the preparation of higher polymer concentrations usually at a sacrifice in the molecular weight. For example, in the polymerization process, stable higher polymer concentrations can be obtained by continuous addition of monomer with retention of the usual polymerization time and molecular weight range by including an effective small proportion of the bis-vinylidene chain extender in the monomer composition.

In carrying out the invention process toward achieving a stable high content of polymer in aqueous dispersion, a polymerization recipe containing a monomer composition in the range of about 40% to 65% based on the total aqueous recipe weight including an effective small proportion of the difunctional chain extender is subjected to aqueous emulsion polymerization conditions with a portion of the monomer composition being charged initially and a significant proportion of the monomer mixture being charged continuously as the polymerization progresses and an aqueous dispersant solution being continuously charged concurrently with the added monomer mixture.

At least 25 parts out of 100 parts total weight of monomer mixture is charged continuously or in frequently added small increments subsequent to initiation of polymerization of the initial monomer charge which may constitute up to 75 parts of the total monomer charge. Preferably, the initial monomer charge constitutes 3 to 30 parts of the total monomer, i.e., preferably from 97 to 70 parts out of a total 100 parts of monomer mixture are added at a substantially uniform rate. The initial aqueous polymerization includes a proportion of water at least equal to the monomer content. Ordinarily, this proportion of water constitutes a major proportion of the total water content of the polymerization recipe, the remaining minor proportion of the water content being the solvent for the water-soluble dispersant subsequently added continuously.

The time interval between initiation of polymerization and beginning of the subsequent continuous addition of monomer generally ranges from 5 to 60 minutes. Preferably, this time interval ranges from 10 to 30 minutes. Generally, the time period for the continuous addition of monomer mixture and addition of dispersant solution ranges from about 30 to 480 minutes, preferably in the range of 60 to 300 minutes. The rate of continuous monomer addition preferably is so controlled that the monomer concentration in the aqueous polymerization reaction zone does not increase significantly throughout the addition, i.e., the rate at which the monomers are supplied is not significantly greater than the rate at which the monomer is converted to polymer in the reaction zone. Thus, the monomer concentration in the polymerization reaction zone either remains substantially constant during monomer addition or it is being diminished as the polymerization advances. Variation in the monomer concentration in the reaction zone can be observed by one or more means. At constant temperature in the reaction zone, variation in reflux rate can be used to gauge variations in monomer concentration. Variations in density and variations in the bromine titre as a measure of unsaturation can be used also to detect changes in the relative proportion of monomer and polymer in the reaction zone.

The initial aqueous polymerization charge preferably is free of dispersant, i.e., the entire amount is added continuously during polymerization. However, a minor proportion up to 30 parts out of a total of 100 parts of dispersant can be included in the initial charge, but ordinarily the relative proportion of dispersant to monomer in the initial charge is no greater than the relative proportion of total dispersant to total monomer in the entire recipe.

While aqueous emulsion polymerization can be conducted at temperatures ranging from a temperature just above the freezing temperature up to the reflux temperature of the aqueous reaction mixture, more practical operating temperatures are in the range of about 50°C. to about 85° C., a range of about 60° C. to 80° C. being particularly preferred.

The reaction mixture is maintained under agitation during polymerization. The degree of agitation can range from slow at about 30 r.p.m. to fast at about 500 r.p.m. Preferably, the agitation is moderate with an agitator speed ranging from 50 to 250 r.p.m. Higher speeds usually result in significant polymer losses due to coagulation.

The reaction mixture is maintained at polymerization conditions in reference to temperature and agitation after the exothermic reaction has subsided for a period ranging from 20 minutes up to about 300 minutes, the preferred period ranges from 30 to about 180 minutes. Thereafter, the aqueous dispersion composition is cooled to about room temperature. The aqueous dispersions of acidic copolymers of monomer mixtures including a copolymerizable monoethylenically unsaturated carboxylic acid usually are adjusted to a pH in the range of 5 to 9, preferably 5.5 to 8. Ordinarily, the pH adjustment is with ammonium hydroxide or a volatile amine, but the adjustment can be made with alkali, such as sodium or potassium hydroxide, when an increased concentration of sodium and potassium ion can be tolerated. Use of ammonium hydroxide is particularly preferred.

The surfactant or dispersant useful in emulsifying the monomers in the aqueous medium and in maintaining the resulting polymer in aqueous dispersion include water soluble salts of fatty alcohol half esters of sulfuric acid, e.g., sodium and potassium lauryl sulfates and other such ester salts where the fatty alcohol contains from 8 to 24 carbon atoms, alkylphenoxypolyethanoxyethanols where the alkyl substituent contains from 7 to 12 carbon atoms, e.g., octyl and nonyl, and the polyethanoxyethanol group is of sufficient chain length to provide water-solubility, this group corresponding preferably to an adduct of 20 to 50 mols of ethylene oxide, water-soluble ethylene oxide adducts of fatty alcohols, and ethylene oxide derivatives of long chain fatty acids. The alkali metal salts of the fatty alcohol half esters of sulfuric acid are preferred.

Generally, the proportion of the water-soluble dispersant or emulsifier ranges up to about 3 parts based on 100 parts by weight of the monomers, but can be as high as 5 parts on this basis and as low as 0.01 part. Preferably, the emulsifier proportion is from 0.03 part to 1 part on the indicated basis. Higher dispersant concentrations generally result in smaller particle-size and dispersions of lower polymer content. Generally, the dispersed polymer particles are substantially uniform in particle-size, the average particle-diameter being in the range of about 0.1 micron to several microns.

Any of the compounds known to generate free radicals and which are soluble at effective concentrations in the aqueous polymerization medium may be used as the polymerization catalyst in practicing this invention. Examples of useful polymerization catalysts include persulfates, perborates, or percarbonates, hydrogen peroxide, organic peroxides such as benzoyl peroxide, cumene hydroperoxide, tertiary butyl peroxide, tertiary butyl perbenzoate, and tetralin peroxide. Ammonium, potassium and sodium persulfates are particularly preferred. Organic peroxides may be used in combination with these inorganic peroxidic catalysts. Azonitrile compounds such as described in U.S. Patent 2,471,959 can be used also as a polymerization catalyst for these vinylidene unsaturated monomers. Polymerization can be promoted also with ultra violet light.

Generally, the proportion of polymerization catalyst is in the range of 0.02% to 3.0% based on the weight of the monomer composition, preferably from 0.05% to 1%, with a range of 0.1% to 0.5% on the indicated basis being especially preferred.

The catalyst is preferably a peroxidic catalyst activated with a reducing agent to provide a redox system. Examples of useful reducing agents include water-soluble bisulfites, such as sodium metabisulfite, sulfites, hydrosulfites, and thiosulfates. The redox system may be further activated by the presence of polyvalent metal ions, e.g., ferrous ions, at concentrations of the order of magnitude of several parts per million, or with tertiary amines which are soluble in the reaction mixture. Other useful redox systems for promoting aqueous emulsion polymerization include: sodium azide and ceric ammonium sulfate, titanium trichloride and acetone oxime, titanium trichloride and hydroxylamine, divalent vanadium ion and hydroxylamine hydrochloride, and copper sulfate and benezenediazo-phenyl sulfone.

The proportion of reducing agent included in the polymerization catalyst combination ordinarily ranges up to 3% based on the weight of the monomers and preferably is in the range of 0.02% to 1% on this basis. In the inorganic redox system of persulfate and bisulfite, the weight ratio can vary from 1 to 10 parts of persulfate per part by weight of bisulfite.

Except for the difunctional chain extender, the polymerizable monomer composition consists essentially of one of more monoethylenically unsaturated compounds having a terminal vinylidene group >C=CH₂. Preferably, the monomer composition includes an ester monomer having the general formula

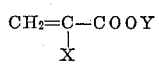

where X— is hydrogen or methyl, and Y— is an alkyl group of 1–18 carbon atoms. In order that the resulting polymer has a desirable balance of properties which cannot be obtained in a homopolymer, the monomer composition may consist of two or more species of copolymerizable monomers. Generally, such a monomer mixture includes a monomer which when homopolymerized yields a hard polymer and a monomer which when homopolymerized yields a soft polymer. Thus, on polymerization of mixtures containing at least one monomer of each of these classes, the soft monomer serves as an internal plasticizer in the copolymer of hard and soft monomers. The generic class of ester monomers identified above includes esters of both the hard and soft classes. The lower alkyl methacrylates having 1 to 4 carbon atoms in the alkyl group, tertiary amyl methacrylate and cyclohexyl methacrylate are recognized as being of the hard class. Alkyl acrylates having tertiary butyl, tertiary amyl or cyclohexyl as the alkyl group also are recognized as being of the hard class, the remaining species of alkyl acrylates of the defined generic ester monomer being of the soft class. The generic class of ester monomers may be divided into a soft sub-class having the general formula

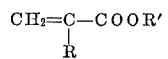

where R— is hydrogen or methyl and R' is a primary or secondary alkyl group of 5 to 18 carbon atoms when R— is methyl and R'— is additionally primary and secondary 1 to 4 carbon atom alkyl when R— is hydrogen. The hard ester sub-class may be identified by the general formula

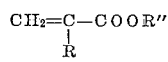

where R— is as defined above, i.e., hydrogen or methyl and R" is 1 to 4 carbon atom alkyl, tertiary amyl or cyclohexyl when R— is methyl and R" is tertiary butyl, tertiary amyl or cyclohexyl when R— is hydrogen.

Other useful monomeric esters of the soft class are: aralkyl acrylates such as benzyl- and methybenzyl acrylates and methacrylates and vinyl esters of monocarboxylic acids, free of polymerizable unsaturation, having more than two carbon atoms per acid molecule, e.g., vinyl propionate, vinyl butyrate, vinyl laurate, vinyl stearate and vinyl benzoate. These esters can be used in place of the preferred esters defined generically above or they may be used in combination therewith.

For the purpose of modifying the chemical properties of the polymer, the monomer mixture may contain one or more other copolymerizable monomers in combination with one or more of the aforementioned ester monomers. Particularly useful monomers which may be recognized as categorically similar to the hard sub-class of ester monomers include acrylonitrile, methacrylonitrile, styrene, vinyl toluene, alpha-methyl styrene, chlorostyrene, vinyl xylene, vinyl acetate, vinyl chloride and vinyl fluoride.

The presence of carboxylic substituent, i.e., —COOH, or carboxylate groups in the copolymer is advantageous in many instances. Useful monoethylenically unsaturated carboxylic acids include acrylic, methacrylic, chloroacrylic, ethacrylic, phenylacrylic, crotonic, itaconic, itaconic monoesters, maleic, maleic monoesters of $C_1$–$C_8$ alkanols, fumaric acid, fumaric monoesters of $C_1$–$C_8$ alkanols, and vinyl-acetic acid. Acids having the ethylenic unsaturation in the form of a terminal vinylidene group are preferred, especially monocarboxylic acids having this unsaturation alpha to the carboxyl group, e.g., methacrylic, acrylic and alpha-substituted acrylic acids. These useful acids can be introduced into the aqueous reaction mixture in water-soluble salt form such as the alkali metal or ammonium salts.

Generally, useful proportions of the carboxylic component can range up to 15% by weight of the monomer mixture; at least 0.5% being required ordinarily to provide a significant carboxyl contribution to the copolymer. Preferably, the proportion of carboxylic component is from 2% to 10% on the indicated basis. Use of a carboxylic acid monomer concentration greater than 15% lead to either solubility of the copolymer in water or dilute alkali or significant swelling of the copolymer in such aqueous media.

The polymer may be still more complex by including still other classes of copolymerizable monomers in the monomer mixture as auxiliary monomer components. Included among the useful auxiliary monoethylenically unsaturated monomers are vinyl ethers, vinyl ketones, vinyl acetals, N-vinyl compounds, allyl esters, allyl ethers, allyl-substituted aldehydes and ketones and their acetals and ketals, acrylic acid amides and methacrylic acid amides.

While monomer compositions useful in practicing this invention may consist of only one of the heretofore defined monomers capable of polymerization alone and free of carboxyl substituent plus the difunction chain extender, the invention is particularly directed to polymerization of monomer compositions containing two or more of the aforementioned monoethylenically unsaturated monomers in addition to the difunctional chain extender, especially to monomer compositions which, exclusive of the difunctional chain extender, are at least ternary in composition. Such monomer compositions include (a) at least one member of the defined soft sub-class of ester monomers having the generic formula

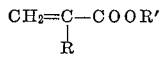

(b) at least one member of the defined hard monomers, and (c) at least one of the defined monoethylenically unsaturated carboxylic acids. While monomers component (b) may be a member of the defined hard sub-class of ester monomers having the generic formula

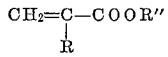

this (b) component preferably includes one of the defined hard monomers having no ester linkage, e.g., acrylonitrile and styrene, in the proportion of at least 20 parts in a total of 100 parts by weight of monoethylenically unsaturated monomers (a) and (b). Generally, monomer (b) ranges up to 80 parts and complementally the soft ester monomer (a) may range from 20 to 80 parts based on the weight of (a) and (b). Preferably, monomer mixtures, at least ternary in composition, have the following proportions of monomers (a), (b) and (c) in 100 parts by weight thereof:

|  | Parts |
|---|---|
| Soft ester monomer (a) | 25–75 |
| Hard monomer (b) | 23–65 |
| Carboxylic monomer (c) | 2–10 |

While the choice of the difunctional chain extender having two terminal vinylidene groups is not significantly critical, it is desirable to select such compounds having a low molecular weight. These preferred chain extenders have a divalent organic radical of short chain length joining the two terminal functional groups. Preferably, the vinylidene equivalent weight of the difunctional chain extender is not significantly greater than the average vinylidene equivalent weight of the monomer composition to which the chain extender is added. For example, when the monoethylenically unsaturated monomer composition consists of ethyl acrylate and methyl methacrylate, each having a molecular weight of about 100, the average vinylidene equivalent weight of the mixture is about 100. The vinylidene equivalent weight is defined as that weight in grams of monomer which provides one gram equivalent weight of vinylidene group $>C=CH_2$. For such a monomer composition, the molecular weight of the difunctional chain extender preferably is not significantly greater than about 200, i.e., the vinylidene equivalent weight is 100 or less. For monomer mixtures having a higher average molecular weight or vinylidene equivalent, difunctional chain extenders having a correspondingly higher vinylidene equivalent weight can be used. Usually the vinylidene equivalent weight of the chain extender is no greater than about 150, preferably about 100 or less.

The divalent organic radical joining the two terminal vinylidene groups of the difunctional chain extender may consist essentially of hydrocarbon carbon atoms free of carbon to carbon unsaturation except for aryl ring unsaturation. One or more oxygen atoms and one or more nitrogen atoms may be present in addition to carbon atoms in the linearity of the divalent organic connecting radical. Such an oxygen atom may be an ether oxygen atom or an oxygen atom joined to a carbonyl carbon atom as in the carboxylate moiety

The nitrogen atom, when present, usually is in the form of an amide moiety

i.e., the nitrogen is joined to a carbonyl carbon. Bisesters and bis-amides are particularly useful as the difunctional chain extender, the terminal vinylidene groups preferably being in the form of

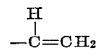

Typical examples of useful difunctional chain extenders of the bis-vinylidene class include:

Methylene bis-acrylamide
Ethylene bis-acrylamide
Trimethylene bis-acrylamide
Tetramethylene bis-acrylamide
Hexamethylene bis-acrylamide
Cyclohexylidene bis-acrylamide
Methylene bis-methacrylamide
Ethylene bis-methacrylamide
Trimethylene bis-methacrylamide
Tetramethylene bis-methacrylamide
Hexamethylene bis-methacrylamide
Ethylene diacrylate
Trimethylene diacrylate
Tetramethylene diacrylate
Pentamethylene diacrylate
Hexamethylene diacrylate
Cyclohexylidene diacrylate
Bis-acrylate of diethylene glycol
Bis-acrylate of triethylene glycol
Bis-acrylate of propylene glycol
Bis-acrylate of dipropylene glycol
Bis-methacrylate of ethylene glycol
Bis-methacrylate of propylene glycol
Bis-methacrylate of diethylene glycol
Bis-methacrylate of triethylene glycol
Trimethylene dimethacrylate
Tetramethylene dimethacrylate
Pentamethylene dimethacrylate
Hexamethylene dimethacrylate
Vinylmethacrylate
Divinyl benzene
Divinyl toluene
Divinyl glycol diacetate
Allyl acrylate
Allyl methacrylate
Acrylic ester of allylcarbinol
Methacrylic ester of allylcarbinol
Diallyl ether
Divinyl phthalate
Divinyl adipate
Diallyl phthalate
Diallyl adipate Of these numerous useful species of difunctional chain extender, methylene bis-acrylamide having a vinylidene equivalent weight of about 77, ethylene diacrylate having a vinylidene equivalent weight of about 85, vinyl methacrylate having a vinylidene equivalent weight of about 56 and divinylbenzene having a vinylidene equivalent weight of about 65 are especially preferred. These particular chain extenders are highly effective at concentrations ranging from $10^{-4}$ to $5\times10^{-2}$ mol percent based on the total mols of monoethylenically unsaturated monomer. Generally, these chain extenders produce microgels when used at significantly higher concentrations, such as $10^{-1}$ mol percent and greater.

The polymerization technique of this invention and the aqueous dispersion polymer products thereof are more specifically described in the following examples wherein the indicated parts and percentages are by weight unless otherwise designated.

EXAMPLE 1

A monomer composition is prepared by mixing the indicated monoethylenically unsaturated monomers in the following proportions:

| | Pounds |
|---|---|
| (a) Butyl acrylate | 51.77 |
| (b) Acrylonitrile | 30.21 |
| (c) Methacrylic acid | 4.32 |
| | 86.30 |

Methylene bis-acrylamide in an amount of 14 grams is added to this monomer mixture to complete the monomer charge. In 100 parts of the monoethylenically unsaturated monomers, there are 60 parts of butyl acrylate, 35 parts of acrylonitrile and 5 parts of methacrylic acid. The proportion of methylene bis-acrylamide corresponds to about $1.7\times10^{-2}$ mol percent, i.e., 0.017 mol percent, based on the mols of monoethylenically unsaturated monomers.

Into a polymerization reaction vessel, equipped with means for agitation and temperature control, are introduced 73.91 pounds of distilled water and 8.25 pounds of the described monomer mixture. This aqueous mixture is heated to 70° C. and at this temperature with continuous agitation 120 grams of ammonium persulfate, as the peroxidic catalyst, and 10 grams of sodium meta bisulfite, as the initiator, are added in dry form. Alternatively, the peroxidic catalyst and the initiator can be separately dissolved in water and appropriate proportions of the respective resulting aqueous solutions added in place of the dry salts. Polymerization is initiated immediately on addition of the redox catalyst system. About 10 minutes after the polymerization is initiated, the remaining proportion of the monomer mixture is charged into the reaction zone at a continuous rate of about 5.40 pounds per 10 minutes in a small stream from a charging funnel. Simultaneously, a preformed aqueous solution of 76 grams of sodium lauryl sulfate in 12.70 pounds of water is charged into the reaction zone in a small stream from a second charging funnel at a continuous rate of about 374 ml. per 10 minutes. The addition time for the monomer mixture is 143 minutes and the addition time for the sodium lauryl sulfate is 160 minutes. The exothermic reaction period continues for about 65 minutes after the final addition of monomer composition. Thereafter, the reaction mixture is held at a temperature of 70° C. for about 90 minutes additional, adjusted ammoniacally to about pH 6.6 and then cooled to about room temperature. The resulting aqueous dispersion polymer composition is characterized by a polymer content of 48.6% by weight and a uniform particle size having an average particle diameter of about 0.5 micron. The polymer exhibits a relative viscosity of 3.79 at 0.5% concentration in dimethylformamide. The dispersion is free of microgel.

EXAMPLE 2

Example 1 is repeated in laboratory scale reaction equipment using a total monomer charge of 1343.2 grams in comparison with 39,140 grams of monomer charge in Example 1. Polymerization conditions are the same as in Example 1. 128.5 grams of the monomer composition are initially added to 1150 grams of water and heated to 70° C. and at this temperature 4.12 grams of ammonium persulfate and 3.43 grams of sodium meta bisulfite are added. After an initial 10 minute polymerization period, the remainder of the monomer composition is added continuously at the rate of about 100 ml. per 10 minutes during a time period of 143 minutes. Simultaneously, a preformed solution of 2.61 grams of sodium lauryl sulfate in 197 grams of water is added continuously at the rate of about 12.3 ml. per 10 minutes during a time period of about 160 minutes. The exotherm time is about 65 minutes and the reaction charge is held at 70° C. for an additional 90 minutes. Thereafter, the aqueous dispersion is cooled and adjusted ammoniacally to about pH 6.6. The polymer content of the resulting aqueous dispersion, the particle-size of the dispersed polymer and the relative viscosity of the polymer matches these respective properties characterizing the dispersion product of Example 1.

A comparative aqueous dispersion composition representative of prior art practice, such as Interpolymer D described in Example IV of U.S. Patent 2,787,603, is prepared as follows: 1110 grams of distilled water are charged into a reaction vessel and 610.2 grams of a monomer mixture consisting of 366.0 grams of butyl acrylate, 213.7 grams of acrylonitrile and 30.5 grams of methacrylic acid is added thereto along with 1.57 grams of sodium lauryl sulfate and 0.307 gram of sodium meta bisulfite. This mixture is heated to 60° C. and then there is added an aqueous solution of peroxidic catalyst consisting of 1.37 grams of potassium persulfate in 32.7 grams of water to initiate polymerization. After 15 minutes, an additional charge of dispersant is added in the form of a solution of 2.92 grams of sodium lauryl sulfate in 42.5 grams of water. The exotherm period for the polymerization reaction is about 90 minutes and thereafter the reaction mixture is held at about 60° C. for about 120 minutes. Then the aqueous dispersion composition is cooled and adjusted ammoniacally to about pH 6.5. This composition is characterized by a polymer content of about 32.3% and an average particle size diameter of about 0.1 micron. The polymer exhibits a relative viscosity of 3.19 at a concentration of 0.5% in dimethyl formamide.

At various proportions of methylene bis-acrylamide (MBA) in the composition of Example 2, the resulting polymers exhibit the following respective relative viscosities in comparison with the described comparative polymer which is free of the bis-vinylidene component.

Table 3

| Mol percent MBA: | Relative viscosity |
|---|---|
| $1.5\times10^{-2}$ | 3.12 |
| $1.7\times10^{-2}$ | 3.87 |
| $1.1\times10^{-1}$ | [1] 1.77 |
| Comparative polymer | 3.19 |

[1] Microgel.

The aqueous dispersion polymer compositions of this example modified with aqueous phenol-formaldehyde resin in the proportion of about 96 parts of polymer solids and 4 parts of phenol/formaldehyde resin solids are useful for impregnating glass fabric in the preparation of electrical insulation, such as slot liners for motors. The properties of polymer-impregnated glass fabric resulting from impregnation with insulating varnishes formulated with the Example 1 and 2 compositions and the indicated comparative composition, respectively, are equivalent. The advantageously higher polymer content of Examples 1 and 2 permits the insulating varnishes to be formulated and applied at a content of organic film-forming material of at least 40% by weight as compared with about 30% for the comparative composition. As a result, only three coats of the example compositions are required in applying the desired coating weight which is applied in four coats of the comparative composition. Thus, the coating period is shortened and less energy is consumed in depositing unit weight of film-forming material.

EXAMPLE 3

First portion: Grams
  Distilled water _____ 1200
  Ferrous ammonium sulfate _____ 0.024
  Monomer mixture _____ 140

Second portion:
  Sodium meta bisulfite _____ 2.1
  Ammonium persulfate _____ 6.3

Third portion:
  Monomer mixture _____ 1267
  Sodium lauryl sulfate solution—7 grams in 200 grams of water _____ 207

The total monomer mixture consists of:
                                          Grams
(a) Butyl acrylate _____ 448
(b) Acrylonitrile _____ 882
(c) Methacrylic acid _____ 70
    Ethylene diacrylate _____ 7
                                         ____
    Total _____ 1407

The relative proportions of the (a), (b) and (c) monomers correspond to 32 parts of butyl acrylate, 63 parts of acrylonitrile and 5 parts of methacrylic acid in a total of 100 parts by weight thereof. The difunctional chain extender ethylene diacrylate is present in the proportion of about $1 \times 10^{-3}$ mol percent based on the mols of monoethylenically unsaturated monomers.

The ingredients of the first portion are mixed and heated to about 60° C. and then the second portion is added to initiate polymerization. After the reaction has progressed for 10 minutes, the ingredients of the third portion are separately added in continuous manner. The monomer mixture is added at the rate of about 100 ml. per 5 minutes during a period of about 73 minutes. The aqueous dispersant at the rate of about 12.5 ml. per 5 minutes during a period of about 75 minutes and the reaction mixture is held at about 60° C. for a total period of about 325 minutes, then cooled and ammoniacally adjusted to about pH 6.5.

The resulting aqueous dispersion composition is characterized by a polymer content of 49.5%, indicating a monomer conversion of at least 98.4%, and an average particle-size diameter of about 0.5 microns. The dispersion is free of microgel and the polymer exhibits a relative viscosity of 5.75 at 0.5% concentration in dimethyl formamide.

This Example 3 repeated with the exception that the concentration of ethylene diacrylate is $8 \times 10^{-3}$ and $1.6 \times 10^{-2}$ mol percent instead of $1 \times 10^{-3}$ results in polymer dispersions having microgel therein and the polymers are characterized by relative viscosities of 2.81 and 2.07 respectively.

These aqueous dispersion polymer compositions modified with aqueous phenol formaldehyde resin as described in U.S. Patent 2,787,603 are particularly useful as wire enamels. Copper wire having the dried coating of these compositions as an electrically insulating layer exhibits electrical performance equivalent to that of wire coated with the composition of Example 1 of the aforementioned patent.

EXAMPLE 4

First portion:                              Wt. in grams
  Distilled water _____ 350
  Monomer mixture _____ 50
Second portion:
  Ammonium persulfate _____ 0.5
  Sodium meta-bisulfite _____ 0.5
Third portion:
  Monomer mixture _____ 450.335
  Dispersant/catalyst solution:
    Sodium lauryl sulfate _____ 2.5
    Ammonium persulfate _____ 2.5
    Sodium meta-bisulfite _____ 1.5
    Water _____ 158.0    164.5

The monomer mixture is prepared by mixing the following monomers in the indicated proportions:
                                              Grams
(a) Ethyl acrylate _____ 250
(b) Styrene _____ 200
(c) Methacrylic acid _____ 50
    Ethylene diacrylate _____ 0.085
    Benzoyl peroxide _____ 0.25

The proportion of ethylene diacrylate is $10^{-2}$ mol percent based on the total mols of the monomers (a), (b) and (c) which are in the relative proportions of 50 parts ethyl acrylate, 40 parts styrene and 10 parts methacrylic acid for a total of 100 parts by weight.

The first portion is heated to 60° C. and then the second portion is added thereto to initiate the polymerization. During a 25 minute period the temperature is raised to 75° C. and thereafter the monomer mixture and the dispersant/catalyst solution of the third portion are separately added at a continuous rate during a 50 minute period. The monomer mixture is added at the rate of about 50 ml. per 5 minutes and the dispersant/catalyst solution is added at the rate of about 15 ml. per 5 minutes. The polymerization charge is held at about 75° C. for about 105 minutes after the final addition of monomer mixture, then cooled to about room temperature and adjusted ammoniacally to about pH 6.3.

The resulting aqueous dispersion polymer composition is characterized by a polymer content of 49% and an average particle size diameter of about 0.2 microns. The polymer exhibits a relative viscosity of 1.27 based on 0.5% polymer in dimethyl formamide. The dispersion is free from microgel.

This composition is particularly useful as a waterborne primer for use under baking type appliance finishes such as used on refrigerators, freezers and washing machines. It is also useful as a primer for use under "Lucite" acrylic resin automotive enamel topcoats. The performance of the polymer coatings formulated with this high solids content polymer composition is equivalent to the coatings formulated with corresponding polymers which are not chain extended with ethylene diacrylate, such as described in U.S. Patent 2,918,391, Example 1 having ethyl acrylate substituted for butyl acrylate in the monomer mixture thereof.

These several described aqueous dispersion polymer compositions are stable at the high polymer content. They resist at least several freeze-thaw cycles of freezing overnight at about 0° F. and thawing to room temperature of about 77° F. in about four hours without coagulation. These compositions are stable against ordinary mechanical stirring at room temperature and against agitation such as associated with freight transportation of the aqueous product in containers. They are also stable against vigorous mixing, such as at 10,000 r.p.m.

It is apparent that many widely different embodiments of the invention may be made without departing from the spirit and scope thereof and, therefore, it is intended not to be limited except as defined by the appended claims.

I claim:
1. A stable high solids content aqueous dispersion copolymer composition comprising a continuous aqueous phase and a dispersed polymer phase consisting essentially of small particles of chain-extended copolymer of (I) a mixture of monoethylenically-unsaturated monomers each having a single terminal $>C=CH_2$ vinylidene group consisting essentially of: (a) 25 to 75 parts of at least one alkanol ester of acrylic acid, (b) 23 to 65 parts of acrylonitrile, (c) 2 to 10 parts of methacrylic acid for a total of 100 parts by weight of said unsaturated monomers (a), (b) and (c), and an effective small molar proportion of (II) methylene bis-acrylamide in the range of $10^{-4}$ to $5 \times 10^{-2}$ mol percent based on the total mols of said monovinylidene monomer mixture (I), said dispersed polymer particles being present in the proportion of 40% to 65% based on the total weight of the aqueous composition, said continuous aqueous phase including in solution in water a water-soluble dispersant comprising an alkali metal salt of a $C_8$–$C_{24}$ fatty alcohol monoester of sulfuric acid in the proportion of 0.03 part to 1 part based on 100 parts of said dispersed polymer, and said aqueous composition being characterized by a pH in the range of 5.5 to 8.0.

2. A stable high solids content aqueous dispersion copolymer composition comprising a continuous aqueous phase and a dispersed polymer phase consisting essentially of small particles of chain-extended copolymer of (I) a mixture of monoethylenically-unsaturated monomers each having a single terminal $>C=CH_2$ vinylidene group consisting essentially of: (a) 25 to 75 parts of at least one alkanol ester of acrylic acid, (b) 23 to 65 parts of styrene, (c) 2 to 10 parts of methacrylic acid for a total of 100 parts by weight of said monoethylenically-unsaturated monomers (a), (b) and (c), and an effective small molar proportion of (II) ethylene diacrylate in the range of $10^{-4}$ to $5 \times 10^{-2}$ mol percent based on the total mols of said monovinylidene-unsaturated monomer mixture (I), said dispersed polymer particles being present in the proportion of 40% to 65% based on the total weight of the aqueous composition, said continuous aqueous phase including in solution in water a water-soluble dispersant comprising an alkali metal salt of $C_8$–$C_{24}$ fatty alcohol monoester of sulfuric acid in the proportion of 0.03 part to 1 part based on 100 parts of said dispersed polymer, and said aqueous composition being characterized by a pH in the range of 5.5 to 8.0.

3. The method of preparing a stable high solids content aqueous dispersion copolymer composition which comprises the steps of preparing a polymerizable monomer composition consisting essentially of: (I) a mixture of (a) 25 to 75 parts of at least one alkanol ester of acrylic acid, (b) 23 to 65 parts of acrylonitrile, (c) 2 to 10 parts of methacrylic acid for a total of 100 parts by weight of said monovinylidene unsaturated monomers (a), (b) and (c), and an effective small molar proportion of methylene-bis-acrylamide in the range of from $10^{-4}$ to $5 \times 10^{-2}$ mol percent, mixing about 3 to 30 parts of said monomer mixture with water as an initial aqueous polymerization charge, heating said initial aqueous charge to a temperature of 60° C. to 80° C., adding a polymerization catalyst consisting essentially of 0.05 part to 1 part of a water-soluble peroxidic catalyst and 0.02 part to 1 part of a water-soluble reducing activator for said peroxidic catalyst, said catalyst proportion being based on 100 parts of said monovinylidene monomers, to initiate polymerization, after an initial polymerization period of 5 to 30 minutes, continuously adding the remaining parts of said monomer mixture over a period of 60 to 300 minutes at a rate such that the monomer input to the reaction zone is substantially no greater than the conversion of monomer to polymer during said monomer addition; separately adding concurrently therewith an aqueous solution of a water-soluble dispersant consisting essentially of an alkali metal salt of a $C_8$–$C_{24}$ fatty alcohol monoester of sulfuric acid in the proportion of 0.03 part to 1 part of said dispersant per 100 parts of said monovinylidene monomers, the concentration of said dispersant in aqueous solution and the rate of addition thereof to the reaction zone are such that the time period of dispersant addition coincides substantially with the time period of said monomer addition; maintaining the reaction zone temperature and mixing conditions for 30 to 180 minutes after the exothermic reaction subsides, cooling the resulting aqueous dispersion composition and adjusting the composition ammoniacally to a pH of 5.5 to 8.0, said 100 parts of monomer mixture being sufficient to provide a monomer concentration of 40% to 65% based on the total weight of the aqueous polymerization recipe.

4. A high solids aqueous dispersion copolymer composition comprising a continuous aqueous phase comprising water and a water-soluble dispersing agent and a dispersed polymer phase consisting essentially of small discrete particles of a chain-extended copolymer of a monomer composition consisting essentially of (I) a mixture, at least ternary in composition, of monoethylenically-unsaturated monomers, each having a single terminal $>C=CH_2$ vinylidene group, consisting essentially of: (a) at least one alkanol ester of acrylic acid, (b) at least one monomer member of the group consisting of acrylonitrile, styrene and alkyl methacrylates having the alkyl group selected from the class consisting of $C_1$ to $C_4$ alkyl, tertiary amyl and cyclohexyl, and (c) an alpha monoethylenically-unsaturated monocarboxylic acid selected from the group consisting of acrylic acid and methacrylic acid, 100 parts by weight of $(a)+(b)+(c)$ being composed of 0.5 to 15 parts of (c) and having (a) and (b) in the relative proportions of from 0.25 part to 4 parts of (b) per part of (a), and (II) a chain-extending diethylenically-unsaturated monomer having two terminal $>C=CH_2$ vinylidene groups per molecule selected from the class consisting of methylene-bis-acrylamide, ethylene diacrylate, vinyl methacrylate and divinyl benzene in an effective small molar proportion in the range of $10^{-4}$ to $5 \times 10^{-2}$ mol percent of (II) based on the total mols of (I), said dispersed polymer particles being present in the proportion of 40% to 65% based on the total weight of the aqueous dispersion composition, said water-soluble dispersing agent comprising an alkali metal salt of a $C_8$ to $C_{24}$ fatty alcohol monoester of sulfuric acid in the proportion of 0.01 part to 5 parts per 100 parts of said dispersed polymer.

5. A high solids aqueous dispersion copolymer composition of claim 4 wherein said monomer mixture (I) consists essentially of:

| | Parts |
|---|---|
| (a) At least one alkanol ester of acrylic acid | 25 to 75 |
| (b) Acrylonitrile | 23 to 65 |
| (c) Methacrylic acid | 2 to 10 | the sum of $(a)+(b)+(c)$ being 100 parts by weight.

6. A high solids aqueous dispersion copolymer composition of claim 4 wherein said monomer mixture (I) consists essentially of:

| | Parts |
|---|---|
| (a) At least one alkanol ester of acrylic acid | 25 to 75 |
| (b) Styrene | 23 to 65 |
| (c) Methacrylic acid | 2 to 10 | the sum of $(a)+(b)+(c)$ being 100 parts by weight.

7. A high solids aqueous dispersion copolymer composition of claim 5 wherein said chain-extending diethylenically-unsaturated monomer (II) is methylene-bis-acrylamide.

8. A high solids aqueous dispersion copolymer composition of claim 5 wherein said chain-extending diethylenically-unsaturated monomer (II) is ethylene diacrylate.

9. A high solids aqueous disperson copolymer composition of claim 5 wherein said chain-extending diethylenically-unsaturated monomer (II) is vinyl methacrylate.

10. A high solids aqueous dispersion copolymer composition of claim 5 wherein said chain-extending diethylenically-unsaturated monomer (II) is divinyl benzene.

11. A high solids aqueous dispersion copolymer composition of claim 6 wherein said chain-extending diethylenically-unsaturated monomer (II) is ethylene diacrylate.

12. A method of preparing a high solids content aqueous dispersion copolymer composition which comprises the steps of blending together (I) a monomer mixture, at least ternary in composition, of monoethylenically-unsaturated monomers, each having a single terminal $>C=CH_2$ vinylidene group, consisting essentially of: (a) at least one alkanol ester of acrylic acid, (b) at least one monomer member of the group consisting of acrylonitrile, styrene, and alkyl methacrylates having the alkyl group selected from the class consisting of $C_1$ to $C_4$ alkyl, tertiary amyl and cyclohexyl, and (c) an alpha monoethylenically-unsaturated monocarboxylic acid selected from the group consisting of acrylic acid and methacrylic acid, 100 parts by weight of $(a)+(b)+(c)$ being composed of 0.5 part to 15 parts of (c) and having (a) and (b) in the relative proportions of from 0.25 part to 4 parts of (b) per part of (a), and (II) a chain-extending diethylenically-unsaturated monomer having two terminal $>C=CH_2$ vinylidene groups per molecule selected from the class consisting of methylene-bis-acrylamide, ethylene diacrylate, vinyl methacrylate, and divinyl benzene in an effective small molar proportion in the range of $10^{-4}$ to $5 \times 10^{-2}$ mol percent of (II) based on the total mols of (I) to provide a total of 100 parts by weight of polymerizable monomer composition, forming an initial aqueous polymerization charge consisting essentially of 3 to 30 parts of said monomer composition and at least an equal weight of water; initiating polymerization of said initial aqueous polymerization charge by heating in the presence of a free-radical-generating vinyl polymerization catalyst for a period of 5 to 60 minutes at a temperature in the range of 50° C. to 85° C.; thereafter continuously adding the remaining 70 to 97 parts of said monomer composition to the intermediate copolymer composition, resulting from said initial stage polymerization, over a period of 30 to 480 minutes; adding concurrently therewith an aqueous solution of a water-soluble dispersing agent comprising an alkali metal salt of a $C_8$ to $C_{24}$ fatty alcohol monoester of sulfuric acid at a rate such that the duration of addition thereof substantially coincides with that of the addition of said remaining portion of the monomer composition; maintaining the polymerization conditions beyond the polymerization exothermic reaction period, and then cooling the resulting aqueous dispersion chain-extended copolymer composition to about room temperature; said polymerizable monomer composition constituting from 40% to 65% by weight of the polymerization recipe, said polymerization catalyst being present in the proportion of 0.02 part to 3 parts and said dispersing agent being present in the proportion of 0.01 part to 5 parts, the parts of polymerization catalyst and dispersing agent being based per 100 parts of said monomer composition.

13. A method of claim 12 having an additional step subsequent to said second stage of polymerization of ammoniacally adjusting the pH of the aqueous dispersion polymer composition to a pH in the range of 5 to 9.

14. A method of claim 12 wherein said free-radical-generating polymerization catalyst consists essentially of a soluble peroxidic catalyst having in combination therewith 0.02 part to 1 part of a reducing activator for said peroxidic catalyst per 100 parts of said monomer composition.

15. A method of claim 12 wherein said diethylenically-unsaturated monomer (II) is methylene-bis-acrylamide.

16. A method of claim 12 wherein said monomer mixture (I) consists essentially of:

| | Parts |
|---|---|
| (a) At least one alkanol ester of acrylic acid | 25 to 75 |
| (b) Acrylonitrile | 23 to 65 |
| (c) Methacrylic acid | 2 to 10 | for a total of 100 parts of $(a)+(b)+(c)$, and said diethylenically-unsaturated monomer (II) is methylene-bis-acrylamide.

17. A method of claim 12 wherein said monomer mixture (I) consists essentially of:

| | Parts |
|---|---|
| (a) At least one alkanol ester of acrylic acid | 25 to 75 |
| (b) Styrene | 23 to 65 |
| (c) Methacrylic acid | 2 to 10 | for a total of 100 parts of $(a)+(b)+(c)$, and said diethylenically-unsaturated monomer (II) is ethylene diacrylate.

References Cited in the file of this patent

UNITED STATES PATENTS

| 2,726,230 | Carlson | Dec. 6, 1955 |
| 2,753,318 | Maeder | July 3, 1956 |
| 2,767,153 | Sutton | Oct. 16, 1956 |